United States Patent Office

Re. 24,414
Reissued Jan. 7, 1958

24,414

BRONZING LACQUER CONTAINING POLYALKYL ACRYLATE AND TRICHLOROFLUOROMETHANE

Robert J. Stetz, Westlake, and Edmund Rogers, South Euclid, Ohio, assignors to The Engine Parts Manufacturing Company, Cleveland, Ohio, a corporation of Ohio No Drawing. Original No. 2,731,436, dated January 17, 1956, Serial No. 146,406, February 25, 1950. Application for reissue October 8, 1957, Serial No. 689,464

9 Claims. (Cl. 260—33.6)

Matter enclosed in heavy brackets [ ] appears in the original patent but forms no part of this reissue specification; matter printed in italics indicates the additions made by reissue.

This invention relates as indicated, to a coating composition characterized by the presence therein of a finely divided metal as the pigmentary material. More particularly, this invention relates to coating compositions containing as a pigmentary material an alloy of copper and zinc which are not subject to the difficulties universally encountered with the so-called "gold," "copper," and "bronze" paints.

The difficulties experienced in the past with the bronzing lacquers have necessitated the employment of various expedients in the attempt to overcome what is known in the trade as "souring" or "greening and gelling." Selected batches of nitrocellulose have been used as well as such organic acids as citric, maleic, and tartaric and various proprietary products. However, it is still preferred to mix the vehicle and bronzing pigment just before using and in such quantities as to have as little as possible left over for the next day. Since these bronzing lacquers are quite expensive, it is necessary that the painter estimate his needs rather closely to avoid waste.

It is, therefore, a principal object of [my] *our* invention to provide a bronzing lacquer which is not subject to "souring" or "greening and gelling" and which may be used from day to day from the same batch weeks after the lacquer containing the bronzing pigment was compounded.

The usual bronzing lacquers have a strong tendency to gel to irreversible masses and must accordingly be handled carefully. It is, therefore, a further object of [my] *our* invention to provide a stable bronzing lacquer free of the tendency to form irreversible masses, it being a property of the compositions of [my] *our* invention that the pigmentary material is readily redispersable into the lacquer base.

Other objects of [my] *our* invention will appear as the description proceeds.

To the accomplishment of the foregoing and related ends, said invention then comprises the features hereinafter fully described and particularly pointed out in the claims, the following description setting forth in detail certain illustrative embodiment of the invention, these being indicative, however, of but a few of the various ways in which the principle of the invention may be employed.

Broadly stated, this invention comprises a metallic or bronzing lacquer comprising a finely divided metallic pigment, a poly-alkyl methacrylate lacquer base in a suitable solvent system, and a fluoro-chloromethane in which all the hydrogen atoms have been replaced by fluorine and chlorine. More particularly, this invention comprises a bronzing lacquer comprising a finely divided copper-zinc alloy as the pigment; a polymethyl methacrylate lacquer base in a solvent system consisting essentially of xylene, or other suitable low boiling monocyclic aromatic hydrocarbon such as benzene or toluene, and methyl or ethyl alcohol; and difluoro-dichloromethane.

By the term "bronzing lacquer" as used herein and in the appended claims, [I] *we* mean a resin-low boiling solvent system containing a "bronzing pigment." The term "bronzing pigment" as used herein and in the appended claims relates particularly to metallic pigments which impart a bronze, gold, copper, or silver color to the dried film and which consist chiefly of copper-zinc alloys.

The fluoro-chloromethanes, which are an essential ingredient of the compositions of this invention, are gases at ordinary pressures, and accordingly, the compositions of this invention exist, at normal temperatures, only at superatmospheric pressures and thus renders these compositions admirably suited to spray application. Of the three possible fluoro-chloromethanes, difluoro-dichloromethane, trifluoro-chloromethane, and mixtures thereof are most suited for use in accordance with [my] *our* invention, the monofluoro-trichloro methane being of too high boiling point for use alone where spray application is desired, and too low boiling point for use at atmospheric pressure. It may, however, be used as a diluent for either or both of the other members of this class in the compositions of this invention.

The fluoro-chloromethane derivative of this invention not only serves as a propellant for spray application, but when in combination with the poly-alkyl acrylate lacquer base and the bronzing pigment, renders the composition stable to the formation of irreversible gels, and obviates the difficulties heretofore experienced with bronzing lacquers, namely, "greening and gelling" or "souring." [I am] *We are* not aware of the mechanism by which these several ingredients co-act to produce this degree of stability in the lacquers of [my] *our* invention and render the pigmented lacquer useful weeks after it has been compounded upon mere shaking of the container to redisperse the bronzing pigment. [I am] *We are* also not aware of the reason why the bronzing pigment, which will settle upon standing, is so readily redispersed as particles of essentially the same size as in the dry pigment form. In other words, even though the pigment will settle out upon standing, there appears to be no tendency for the individual particles to agglomerate and redisperse as particles of substantially increased size.

The second essential ingredient of [my] *our* invention is a poly-alkyl acrylate resin which serves in whole or in part as the lacquer resin. Specific examples of such resins include the polymethyacrylates, the polyethylacrylates, the polybutylacrylates, and the methacrylate ester polymers, such as the methyl, ethyl, n-propyl, n-butyl, and isobutyl. Of these, [I] *we* prefer to use polymethyl methacrylate. These materials, which range from soft, sticky, semi-liquids to tough, hard solids, are not useful as such in [my] *our* invention and are desirably used in conjunction with a suitable solvent system which may consist of a single solvent material, or a plurality of solvent materials. The acrylate resins are generally soluble in aromatic hydrocarbons, chlorinated hydrocarbons, and esters. In certain instances, the viscosity of the solution may still be too high for practical usage in which case the viscosity may be further decreased by dilution with alcohols, e. g. methyl alcohol, ethyl alcohol, and much less desirably isopropyl alcohol. [I] *We* prefer to use the aromatic hydrocarbons of relatively low boiling point, particularly the monocyclic aromatic hydrocarbons such as benzene, toluene, and xylene. It may be found desirable to further dilute such a solution with ethyl or methyl alcohol, although [I] *we* have found it to be unnecessary particularly with the semi-liquid acrylate resins. In general, such lacquer solutions contain anywhere from 8% to 50% solids. Polymethyl methacrylate lacquers (clear) usually contain from about 20% to 30% solids.

The bronzing pigments of [my] *our* invention are preferably of the copper-zinc alloy type since these have been found to be the worst of the various metallic pigments insofar as the undesirable characteristics mentioned above are concerned. Aluminum pigment may be used to replace part or all of the bronzing pigment in this invention and will give satisfactory results.

It becomes convenient at this point to illustrate [my] *our* invention by giving specific examples of compositions suitable for use in accordance with this invention, it being understood that these examples are for illustrative purposes only and are not to be construed as limiting the invention to the scope thereof.

EXAMPLE I

| | | |
|---|---|---|
| Polymethyl methacrylate lacquer (22% solids) | gallon | 1 |
| Powdered brass | pound | 1 |
| Difluoro-dichloromethane | gallon | 0.5 |
| [Trifluoro-chloromethane] *Trichloro-fluoromethane* | gallon | 0.5 |

EXAMPLE II

| | | |
|---|---|---|
| Polymethyl acrylate lacquer (20% solids) | gallon | 0.75 |
| Powdered brass | pound | 0.5 |
| Difluoro-dichloromethane | gallon | 0.4 |
| [Trifluoro-chloromethane] *Trichloro-fluoromethane* | gallon | 0.6 |

EXAMPLE III

| | | |
|---|---|---|
| Polyethyl methacrylate lacquer (24% solids) | gallon | 1 |
| Powdered brass | pound | 0.75 |
| Difluoro-dichloromethane | gallon | 0.5 |
| [Trifluoro-chloromethane] *Trichloro-fluoromethane* | gallon | 0.5 |

EXAMPLE IV

| | | |
|---|---|---|
| Polybutyl acrylate lacquer (27% solids) | gallons | 1.5 |
| Powdered brass | pound | 1 |
| Difluoro-dichloromethane | gallon | 0.5 |
| [Trifluoro-chloromethane] *Trichloro-fluoromethane* | gallon | 0.5 |

EXAMPLE V

| | | |
|---|---|---|
| Polymethyl methacrylate lacquer (20% solids) | gallon | 1 |
| Powdered brass | pounds | 1.5 |
| Difluoro-dichloromethane | gallon | 0.6 |
| [Trifluoro-chloromethane] *Trichloro-fluoromethane* | gallon | 0.5 |

EXAMPLE VI

| | | |
|---|---|---|
| Polymethyl methacrylate lacquer (20% solids) | gallon | 1 |
| Powdered "Silver" (copper-zinc alloy) | pound | 1 |
| Difluoro-dichloromethane | gallon | 0.5 |
| [Trifluoro-chloromethane] *Trichloro-fluoromethane* | gallon | 0.5 |

The bronzing pigments suitable for use in the compositions of [my] *our* invention are finely divided, that is, such pigmentary materials should be 200 to 400 mesh size, preferably finer than 325 mesh. The amount of the pigment employed in these compositions ranges from 0.5 to about 1.5 pounds per gallon of lacquer base, a ratio of one pound per gallon being most satisfactory for good coverage. As indicated above, the acrylate resins may be purchased in the form of clear lacquers containing from 8% to 50% or more solids. While it is generally unnecessary to further alter the commercial lacquers prior to use in the compositions of [my] *our* invention, where the clear lacquer is too viscous, it may be found desirable to further dilute with methyl or ethyl alcohol. Ordinarily, however, the solvent power of the fluoro-chloromethane component will adjust the viscosity to that which is proper for spray application. The fluoro-chloromethanes mentioned in the preceding examples are commercially available under the trade names, Freon 12 ($CCl_2F_2$) and Freon 11 [($CClF_3$)] ($CCl_3F$). A fifty-fifty mixture of these two Freons yields pressures at ordinary temperatures, ranging from about 27 to 30 pounds per square inch; a sixty-forty mixture of Freon 11 and Freon 12, respectively, gives pressures of about 40 p. s. i. [I] *We* prefer to use mixtures of these materials which will yield pressures less than about 40 pounds, and preferably in the range of pressures provided by a fifty-fifty mixture of Freons 11 and 12. While [I] *we* prefer to use the fluoro-chloromethane in substantially equal amount by volume with the lacquer, amounts ranging from 35% to 75% of the final volume may be used.

In actual practice, the improvements in stability or shelf-life of the coating compositions of this invention are obtained by selecting a container fitted to receive a valved outlet and filling it about half full with a clear lacquer of the types indicated above. This lacquer may be thinned with alcohol or xylol if desired. Thereafter, the proper amount of finely divided pigment, such as powdered brass, is weighed into the container. The container is then cooled to a temperature below the boiling point of the Freon or Freon mixture by suitable means. At this reduced temperature, usually about 0° F., the container is filled to the top with liquid Freon and sealed with the valve and valve collar assembly. The entire operation from the addition of Freon should be done in as short a period as possible to avoid loss of Freon.

Other modes of applying the principle of [my] *our* invention may be employed, change being made as regards the details described, provided the features stated in any of the following claims or the equivalent of such be employed.

We therefore particularly point out and distinctly claim as our invention:

1. A bronzing lacquer comprising a finely divided metallic pigment, a poly-alkyl acrylate lacquer base in a solvent for said lacquer base, and an amount by volume approximately equal to the foregoing ingredients of fluorochloromethane.

2. A bronzing lacquer comprising a finely divided copper-zinc alloy pigment, a poly-alkyl acrylate lacquer base in a solvent for said lacquer base, and an amount by volume approximately equal to the foregoing ingredients of fluoro-chloromethane.

3. A bronzing lacquer comprising a finely divided metallic pigment, a polymethyl methacrylate lacquer base in a solvent for said lacquer base, and an amount by volume approximately equal to the foregoing ingredients of fluoro-chloromethane.

4. A bronzing lacquer comprising a finely divided copper-zinc alloy pigment, a poly-alkyl acrylate resin lacquer base in a solvent for said lacquer base, and a mixture of dichloro-difluoromethane and [trifluoro-chloromethane] *trichloro-fluoromethane* in an amount approximately equal to the volume of the pigment and resin lacquer and solvent.

5. A bronzing lacquer comprising a finely divided copper-zinc alloy pigment, a poly-alkyl methacrylate lacquer base in a solvent for said lacquer base at a concentration of from about 8% to about 50% solids, and an amount by volume approximately equal to the foregoing ingredients of fluoro-chloromethane.

6. A bronzing lacquer comprising a finely divided copper-zinc alloy pigment, a polymethyl methacrylate lacquer base in a solvent for said lacquer base at a concentration of from about 20% to 30% solids, and a mixture of difluoro-dichloromethane and [trifluoro-chloromethane] *trichloro-fluoromethane* in an amount approximately equal in volume to the volume of all the other ingredients.

7. A bronzing lacquer comprising in combination in amounts substantially equivalent to the following:

| | | |
|---|---|---|
| (a) A bronzing pigment | pounds | 0.5–1.5 |
| (b) Poly-alkyl acrylate lacquer base in a solvent for said lacquer base | gallon | 1 |
| (c) Fluoro-chloromethane | do | 1 |

8. A bronzing lacquer comprising in combination in amounts substantially equivalent to the following:

| | | |
|---|---|---|
| (a) A copper-zinc alloy pigment—200–400 mesh | pounds | 0.5–1.5 |
| (b) Polymethyl methacrylate in a solvent for said polymethyl methacrylate—20%–30% solids | gallon | 1 |
| (c) Difluoro-dichloromethane | do | 0.5 |
| (d) [Trifluoro-chloromethane] *Trichloro-fluoromethane* | gallon | 0.5 |

9. A bronzing lacquer comprising in combination in amounts substantially equivalent to the following:

| | | |
|---|---|---|
| (a) A brass pigment—200 to 400 mesh | pound | 1.0 |
| (b) Polymethyl methacrylate in a monocyclic aromatic hydrocarbon solvent system | gallon | 1 |
| (c) Difluoro-dichloromethane | do | 0.5 |
| (d) [Trifluoro - chloromethane] *Trichloro - fluoromethane* | gallon | 0.5 |

References Cited in the file of this patent or the original patent

UNITED STATES PATENTS

| | | |
|---|---|---|
| 1,945,998 | Rotheim | Feb. 6, 1934 |
| 2,321,023 | Goodhue et al. | June 8, 1943 |
| 2,366,850 | Gardner | Jan. 9, 1945 |

FOREIGN PATENTS

| | | |
|---|---|---|
| 811,418 | France | Jan. 14, 1937 |